US010025626B2

(12) United States Patent
Clayton et al.

(10) Patent No.: US 10,025,626 B2
(45) Date of Patent: Jul. 17, 2018

(54) ROUTING JOB SUBMISSIONS BETWEEN DISPARATE COMPUTE ENVIRONMENTS

(71) Applicant: Cycle Computing, LLC, Greenwich, CT (US)

(72) Inventors: Douglas Clayton, Durham, NC (US); Andrew Kaczorek, Carmel, IN (US); Jason A. Stowe, Greenwich, CT (US); Ben Watrous, Greenwich, CT (US); David Watrous, Schenectady, NY (US)

(73) Assignee: Cycle Computing, LLC, Greenwich, CT (US)

( * ) Notice: Subject to any disclaimer, the term of this patent is extended or adjusted under 35 U.S.C. 154(b) by 0 days.

(21) Appl. No.: 14/432,107

(22) PCT Filed: Sep. 27, 2013

(86) PCT No.: PCT/US2013/062294
§ 371 (c)(1),
(2) Date: Mar. 27, 2015

(87) PCT Pub. No.: WO2014/052826
PCT Pub. Date: Apr. 3, 2014

(65) Prior Publication Data
US 2015/0242242 A1 Aug. 27, 2015

Related U.S. Application Data

(60) Provisional application No. 61/707,587, filed on Sep. 28, 2012.

(51) Int. Cl.
*G06F 15/173* (2006.01)
*G06F 9/48* (2006.01)
(Continued)

(52) U.S. Cl.
CPC .......... *G06F 9/4887* (2013.01); *G06F 9/505* (2013.01); *G06F 9/5083* (2013.01);
(Continued)

(58) Field of Classification Search
None
See application file for complete search history.

(56) References Cited

U.S. PATENT DOCUMENTS 7,249,179 B1 * 7/2007 Romero ................ G06F 9/5083
709/221
8,544,017 B1 9/2013 Prael et al.
(Continued)

OTHER PUBLICATIONS

International Search Report and Written Opinion of the International Searching Authority in corresponding PCT Application No. PCT/US2013/062294, dated Dec. 30, 2013 (8 pages).
(Continued)

*Primary Examiner* — S M Rahman
(74) *Attorney, Agent, or Firm* — Workman Nydegger

(57) ABSTRACT

A system and method are provided for directing a workload between distributed computing environments. Performance and use data from each of a plurality of computer clusters is monitored on a periodic or continuous basis. The plurality of computers can include a first subset being in a first region and a second subset being in a second region. Each region has known performance characteristics, zone of performance and zone of reliability which is used in distributing a workload or job. A job is received at the system, wherein the system determines a routing for the job to a distributed computing environment, wherein the routing is in response to the obtained performance and use data, and the region encompassing the given computer cluster.

20 Claims, 4 Drawing Sheets

(51) Int. Cl.
G06F 9/50 (2006.01)
H04L 29/08 (2006.01)
H04L 12/26 (2006.01)
(52) U.S. Cl.
CPC ...... *H04L 43/0823* (2013.01); *H04L 67/1008* (2013.01); *H04L 67/1021* (2013.01); *G06F 2209/486* (2013.01); *G06F 2209/508* (2013.01)

(56) References Cited

U.S. PATENT DOCUMENTS

| | | | |
|---|---|---|---|
| 2004/0163085 A1 | 8/2004 | Dillenberger et al. | |
| 2004/0215792 A1 | 10/2004 | Koning et al. | |
| 2005/0198069 A1* | 9/2005 | Cherry | G06F 3/1203 |
| 2007/0285706 A1* | 12/2007 | Nguyen | G06F 3/1204 |
| | | | 358/1.15 |
| 2012/0197959 A1 | 8/2012 | Oliver et al. | |

OTHER PUBLICATIONS

"Performance-Effective and Low-Complexity Task Scheduling for Heterogeneous Computing" IEEE Transaction on Parallel and Distributed Systems, vol. 13, No. 3, Mar. 2002.
"A dynamic and reliability-driven scheduling algorithm for parallel real-time jobs executing on heterogeneous clusters" Journal of Parallel and Distributed Computing, May 17, 2005.

* cited by examiner

ROUTING JOB SUBMISSIONS BETWEEN DISPARATE COMPUTE ENVIRONMENTS

BACKGROUND OF THE INVENTION

Technical Field

The present disclosure relates to high performance computing systems, and more particularly to a method and system for automatically directing a workload or job away from busy or more loaded distributed computing environments to idle or less loaded environments and/or environments that are dynamically scalable.

Description of Related Art

Job scheduling environments enable the distribution of heterogeneous compute workloads across large compute environments. Compute environments within large enterprises tend to have the following characteristics:

Static size;
Typically built out of physical machines;
Largely homogeneous configuration;
Heavily connected within the same cluster;
Loosely connected with other regional clusters;
Poorly connected to clusters in other geographic locations;
Shared storage space typically not accessible between clusters; and
It is common to see hot spots where one cluster is busy and another is idle.

As a result of variations in regional cluster size and regional workload demand, it is attractive to run jobs in other regions or geographic locations. However, since the workloads tend to be tightly coupled by network and storage constraints, it is difficult to build a functional workload that spans resources across these zones of high performance compute, networking, and storage resources.

The current art in job scheduling deals with reconfiguring physical hosts based upon job scale (U.S. Pat. No. 8,544,017), without considering the availability of other computing environments besides local, or internal, servers, including remote, or external/cloud, resources.

SUMMARY OF THE INVENTION

The present disclosure addresses the shortcomings of the prior art by disclosing a system and method for transparently (without requiring additional user or submitter input) routing computational jobs between disparate computing environments, in either a single distribution or through a multi-pass routing. In addition, the present disclosure addresses the need to ensure the data in a submitted job is present in a remote environment via the creation of transfer jobs whose completion guarantees that the data is transferred, or synchronized, either by the transfer job itself or an asynchronous system.

In one aspect of the disclosure, the command-line software, API calls, or other submission interface that submit a workload (job) to compute resources itself determines whether a job should be placed on local resources or moved to one or many remote computing clusters based upon factors that can include, for example, application availability, local queue wait times for the job versus data transfer times plus remote queue wait times for the jobs in various remote clusters. Based upon this routing decision, in one aspect of the system, the software could move all the individual jobs in the submission to the optimal local or remote environment, or in another aspect of the invention, iteratively route a subset of the jobs and reconsider the optimal place for the remainder over a plurality of iterations.

In another aspect of the disclosure, the command-line software, API calls, or other submission interface could request a routing decision by sending a submission description to a separate software component via a network or other API call(s) and submits the jobs corresponding to the response to the submission description.

In another aspect of the disclosure, when the submitted job is placed on servers that are not local to the data, the submitted job relies upon, the input data and output, or results, data are guaranteed to be synchronized by adding the submitted job to a workflow that executes the synchronization or synchronization check for inputs in a transfer job step before, and a similar transfer job step after to synchronize the outputs after the submitted job. This workflow includes a first job whose completion signals that all data required to start the job is present on the remote system, having executed the data synchronization itself or alternately checking to see if the data has been transferred by an asynchronous process, and it is appropriate to start the submitted job. That is, the data on the remote system is verified as step independent step of the data transfer. The computing job that was submitted is then processed, and the optional final transfer job completes when any generated output data is transferred back to the original local, or internal, compute environment.

The present disclosure provides a system and method for any developer of high performance compute applications to make use of compute resources across an internal enterprise and/or multiple infrastructure-as-a-service (IaaS) cloud environments, seamlessly. This is done by treating the each individual cluster of computers, internal or external to the closed enterprise network, as regions of computational power with well-known performance characteristics surrounded by a zone of performance and reliability uncertainty. This system transfers the data, or ensures the data is transferred asynchronously, and migrates the workload to remote clusters as if it existed and was submitted locally. The decision making and execution of this workflow is implemented as a complete transparent process to the developer and application. That is, no input, other than the job, is required of the user. In the event that no optimal cluster exists in a routing table, the decision making can optionally create a cluster in the cloud using provisioning APIs, and add that cluster to the routing table. Thus, the system can dynamically modify the available cluster environment in response to existing conditions. The complexities of the data and job migration are not exposed to the developer or application. The developer need only make their application function in a single region and the present system automatically handles the complexities of migrating the job to other regions.

The present approach places compute geographically separated compute resources in the same scheduling environment and treats local and remote environments as equivalent. Two factors in the incumbent approach contribute to make the present approach a superior solution for the problem. Factor one: operations across questionable WAN links that execute under the assumption of low latency and high bandwidth will consistently fail. Factor two: performance characteristics of global shared storage devices are typically so slow that they result in the perception of failure due to lack of rapid progress on any job in the workload. By avoiding both of these pitfalls, the present approach ensures jobs can flow between environments more readily, and the execution of these jobs can proceed with the speed and reliability that the developer would expect when running on an internal cluster located in one region. The only additional costs paid in the scenario where the present system is used is the migration of data from the local to the remote cluster to support the job execution along with the transfer of result data back to the origination region after the computation has completed at the remote region.

The system continuously gathers detailed performance and use data from the clusters, and uses this data to make decisions related to job routing based on parameters such as:

The desire of the user or automated workload to direct the jobs to an internal environment based on security, performance, and regulatory compliance considerations;

Tolerance of the cost of running in an external, dynamic computing environment such as Amazon's AWS service;

Current utilization of all compute resources across the entire computing landscape; and Bandwidth available between clusters for data transfer.

The matchmaking algorithm used to determine the eventual compute job routing is configurable to account for a variety of dynamic properties. The present system performs meta-scheduling for workloads by applying all the knowledge it has about the jobs being submitted and the potential clusters that could run the jobs and routing jobs to the appropriate regions automatically, without application, developer or end user intervention. The job meta-scheduling decision happens at submit time and immediately routes the jobs out to schedulers that then have the responsibility for running the work on execute machines in specific regions, either internal or external, static or dynamic.

The present system allows for clusters and jobs scheduled in to them, to run completely independent of each other, imparting much greater stability as the need for constant, low-latency communication is not required to maintain a functional environment. The system also allows for these clusters to function entirely outside of the scope of this architecture, providing for a mix of completely local workloads and jobs that flow in and out from other clusters via the meta-scheduling algorithm. This allows legacy interoperability and flexibility when it comes to security: in cases where it is not desirable for jobs to be scheduled to run remote to their point of submission by the system, the job may be tagged such that the system will submit only to a local region or specified set of validated regions. The system also promotes high use rates among widely distributed pools of computational resources, with more workloads submitted through the meta-scheduling algorithm resulting in greater overall utilization.

The present disclosure provides:

A process for determining a proper routing of a job submission, whether as a set of service requests or command-lines to be executed, to a proper cluster environment, with appropriate routing between a plurality of different local or remote environments, or clusters, based upon attributes about the state of the clusters (such as time waiting in the queue, how "full" a given cluster is of jobs, network bandwidth, geographic location, availability of a given environment for the submitted job (such as security or access issues), user direction (explicit tagging or option setting, including the queue the job is submitted to), and submission hints of other kinds including administrator set parameters and business logic, using a matchmaking, or ranking, process between the available options.

It is understood the process can include routing the submitted jobs all at once or a fraction at a time (iteratively) between potential cluster environments. Further, is it is understood the routing may be changed prior to execution of all the submitted jobs, as corresponding to existing or updated attributes.

The present disclosure includes a process for moving a submitted job to a remote cluster, or environment, which creates a new workflow that has a transfer job whose completion indicates the data the submitted job relies upon is in the remote environment, either through synchronous (just in time) or asynchronous transfer (beforehand), then running the submitted jobs, then a dependent final transfer job whose completion indicates the data the job created is submitted back to the cluster the job was submitted from originally. However, it is also understood the data the job created can be presented or submitted to a different cluster than received the job.

BRIEF DESCRIPTION OF THE DRAWING FIGURES

DETAILED DESCRIPTION OF THE INVENTION

A preferred embodiment of a process and system according to the invention will be described, but the invention is not limited to this embodiment. It is understood that the submitted job routing process to local and remote resources performed by the system may be performed on all the submitted jobs at once (completely), or in multiple passes on a fraction of the jobs (e.g. "iteratively"). Additionally, the data transfer workflow process performed by the system to move input and output data from and back to the local cluster can be performed synchronously (e.g., "just in time," JIT) or asynchronously (before by another process).

A preferred embodiment where a job is submitted through a command-line or API that mimics the prior native command-line and API interface for a given job scheduler, or cluster, prompting a routing decision between a local computing environment and/or a plurality of remote environments, where attributes of the submitted jobs, the remote clusters, and the applications in question yield a placement (or routing) decision. If the submitted job remains in a local (or internal) environment or cluster because the local or internal environment is available or otherwise is the proper placement for the submitted job, then the job is submitted for execution.

If no optimal cluster exists in a routing table of available clusters, the decision making can optionally create a cluster in the cloud using provisioning APIs, and add that cluster to the routing table. Otherwise if one or more remote clusters, or environments, from the routing table and matchmaking process are the right places to put the job, the submitted job becomes dependent upon an initial transfer job that moves synchronously or checks an asynchronous transfer for, the data of the submitted job into the remote cluster or clusters, then the portions of the submitted job going to each remote cluster are executed once that transfer job is completed, with a similar final transfer job ensuring the data has moved back to the original location of the submitted job (data), or another directed final location.

Figure 1:
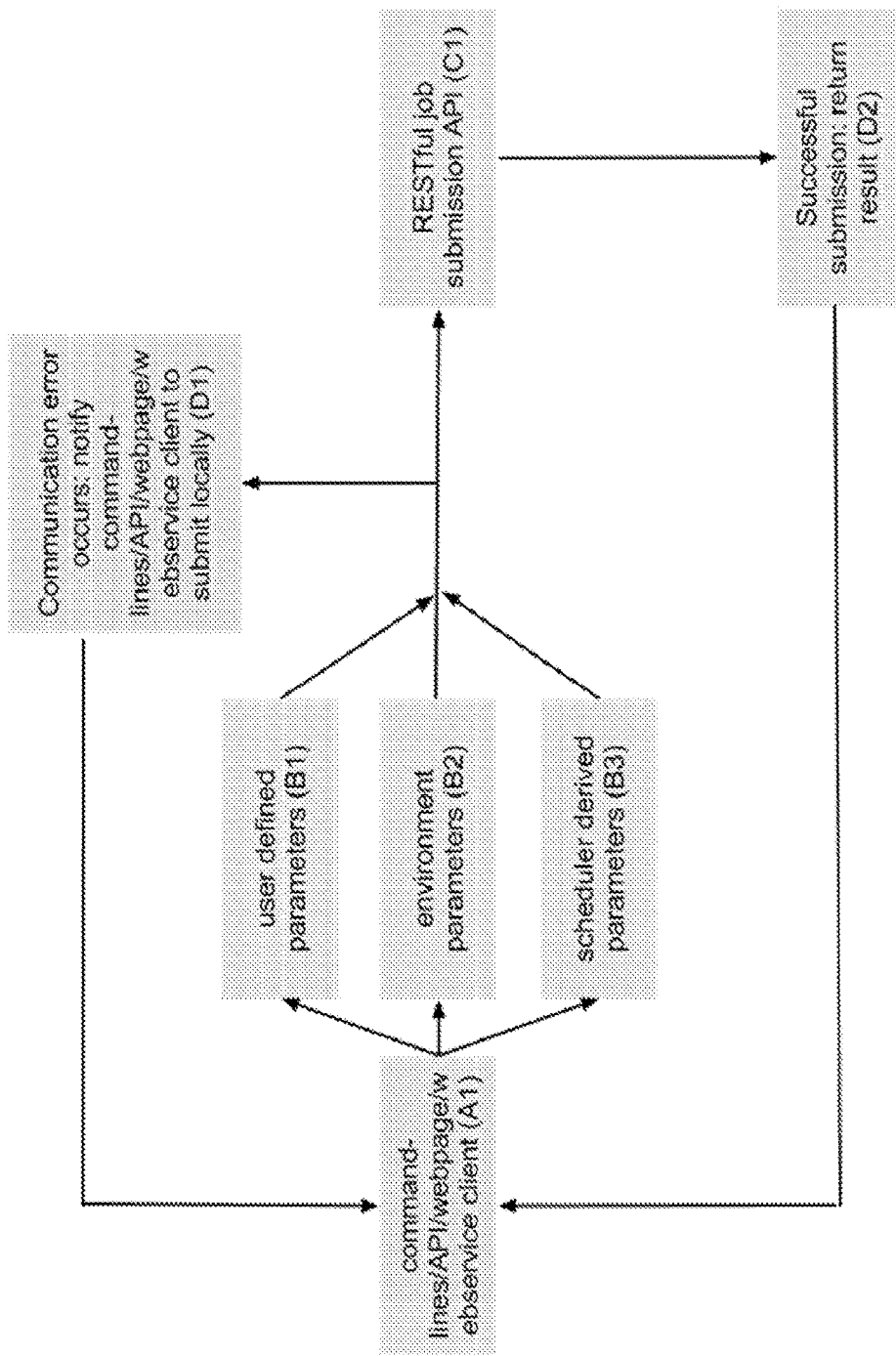
FIG. 1 is a block diagram which shows a process of job submission by an end user or a job submission portal.

Referring to FIG. 1, a block diagram, which shows a process of job submission by an end user or a job submission portal. A job refers to a unit of work or set of instructions given to an operating system to execute.

The processes and components in this system are:
Communication methods that are commoditized and easily passed through regional and Internet-facing firewalls.
Detailed monitoring of the OS-level and scheduler-level health that allows for job routing decisions based on collected health metrics.
Command-lines/API/webpage/webservice (A1) that are configured to emulate the native utilities of the scheduler, or cluster, to provide aggregated job, host, and queue monitoring across the entire computing environment and not just for one region.
Additional metadata about the job submission that can be passed in through configuration files, job submission directives, and native scheduler variables.
The job submission command-lines/API/webpage/webservice gathers (B2) environment information (B3) derived variables pulled from a dry run of the routing/submission and (B1) user input metadata.
In the case where the server environment (C1) is unavailable or takes too long to respond, the job submission executable will always execute the submission locally (D1). This way, job submission always occurs within a predefined time interval.
In the case where a task runs on multiple clusters, the output will be differentiated through the workflow using a prefix designated by the cluster name as defined in the system.
The output of the job submission should be identical to the output produced by the native scheduler commands. This way, users, workloads, or APIs that leverage this system can interoperate transparently with this system. This output is returned by the server environment during typical execution (D2)

Figure 2:
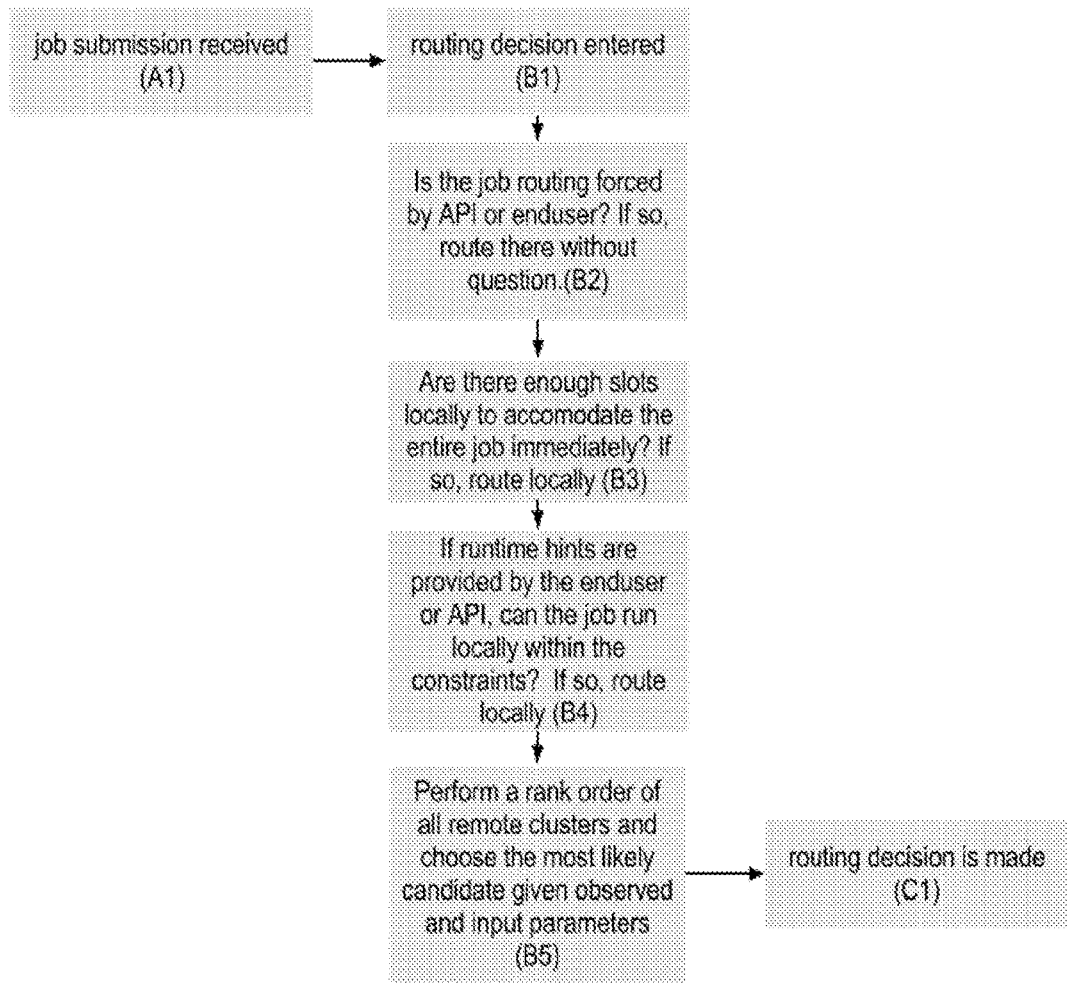
FIG. 2 is a block diagram which shows the routing engine and the variables to which the decision can correspond.

Referring to FIG. 2, a block diagram is provided showing the routing engine and the variables that can drive the decision. The processes and components in this system are:
GUI dashboards within a server architecture that can be used to configure, manage, and monitor the job routing and submission behaviors. (A1)
Default submission configurations that can be used by administrators to configure the system to conform to their specific policies and expectations. (B1)
Metadata that can be defined for the scheduling environments such as, but not limited to, security domain, authorized user groups, geographic location, available shared storage space, advertised applications, current capacity, oversubscription thresholds and dynamic execute node capabilities. This metadata can be input during configuration and/or derived in realtime by the monitoring environment. (B5)
Preference may be given to routing the job locally if it is most expedient. (B2, B3, B4)
The full matchmaking routine is only entered if local routing is not immediately apparent. (B5)
The routing decision is ultimately used to process the actual submission, no matter what cluster unit is chosen. (C1)

Figure 3:
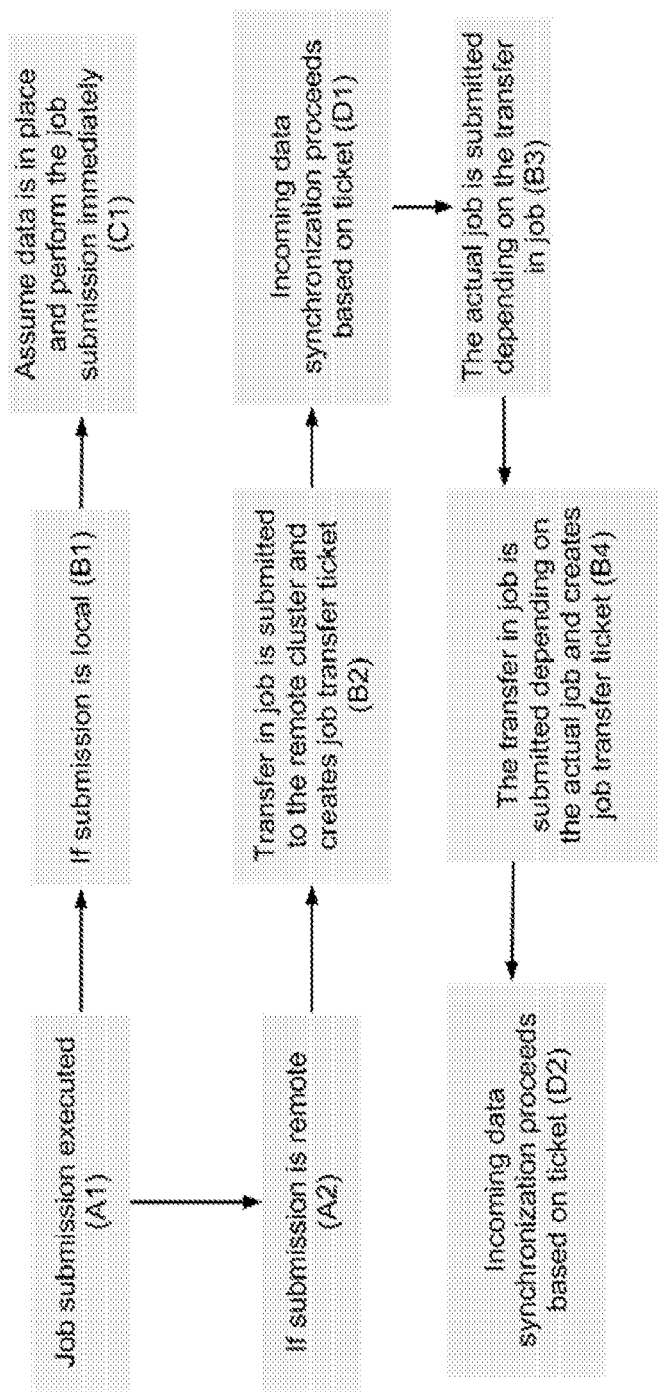
FIG. 3 is a block diagram which shows the workflow of a remote job submission including data transfer and scheduler (or cluster/environment) interaction.

FIG. 3 is a block diagram which shows the workflow of a remote job submission including data transfer and scheduler interaction.

The processes and components in this system are:
A hub-and-spoke design for a central server to communicate with one or more cluster units. (A1)
The key decision during the submission is whether or not the routing is local or remote, because this dictates the requirement to move data. (B1, A2)
Cluster units can represent both internal clusters of machines and external clusters of machines, with statically allocated or dynamically allocated lists of computational resources.
A ticket-based data transfer mechanism that can provide both internal-initiated and external-initiated data transfers on either a scheduled or on-demand basis. (B2, B4) (D1, D2)
Secure, reliable communication between the central server and the remote nodes for command execution. (C1, B3)
Proper error handling of any potential failure before, during, or after a committed job submission. If any errors are encountered, submit locally as a failsafe. (C1)

Figure 4:
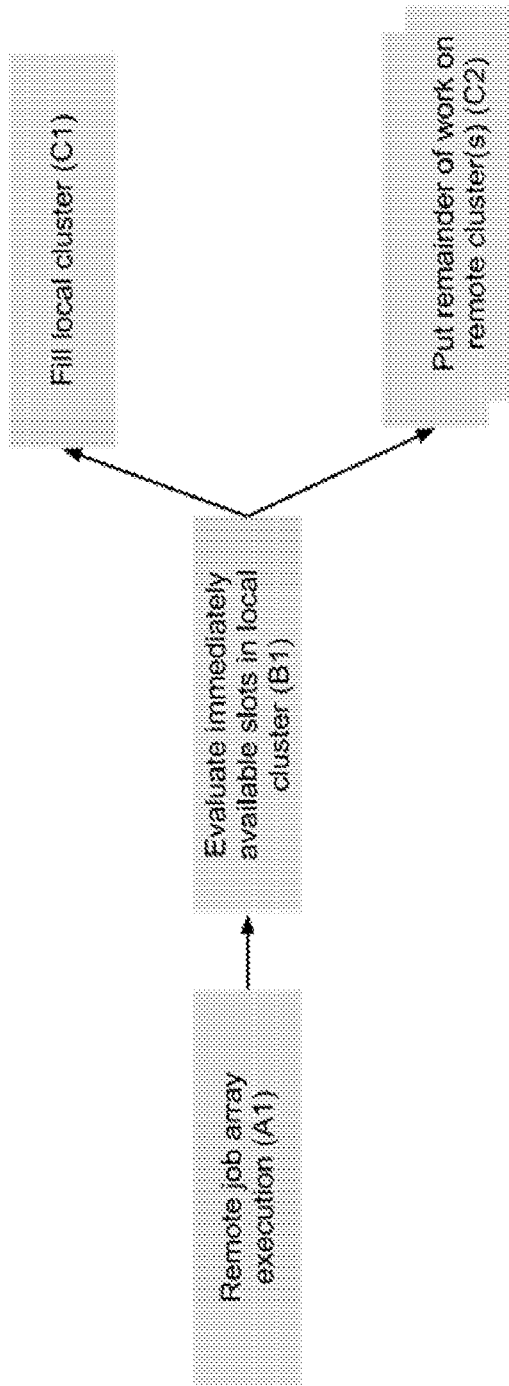
FIG. 4 is a block diagram that shows the process of backfilling work onto a partially idle internal cluster when submitting to a remote cluster.

FIG. 4 is a block diagram that shows the process of backfilling work onto a partially idle internal cluster when submitting to a remote cluster. The processes and components in this system are:
When a job submission is committed to a particular cluster unit, there is an opportunity for further load balancing. Although the bulk of the workload is designated for the remote cluster unit, a subset of the workload may be carved off to run on local resources that are immediately available, decreasing the overall runtime. (A1)
This branch of behavior is only taken if the following is true: (1) the submission is not a tightly coupled parallel job (2) the submission is a job array (3) the ability to split task arrays is enabled within the system.
The system counts the number of available execution slots, counts the running jobs, and calculates the available slots. (B1)
The job array is split such that the local cluster is filled first (C1) and the remainder of jobs is submitted to selected remote cluster(s). (C2)
These two or more submissions created for (C1) and (C2) are processed, and the workflow proceeds as described above.

It is also contemplated that the system can provide, or obtain, user authorization across multiple security domains. Specifically, remote computing environments have distinct authorization and entitlement domains for users. The system handles domain traversal transparently, without requiring individualized user authentication for each domain. Upon first use by a new user, the system requests authentication against available remote computing environments (such as via password or encryption key). Future uses by the user can then authenticate automatically unless the privileges of the user have been revoked. The routing decision for the respective job submissions will select only among, or filter authenticated remote environments for the submitting user.

In a further configuration, the system provides for multi-pass routing for job arrays. When a very large job array is submitted to the system, the sum of all available slots in all clusters may be insufficient to run all jobs immediately. In this case, the system may perform multiple meta-scheduling passes for a single job array. Each meta-scheduling pass proceeds to split the job array further as described in FIG. 4. The system will continue ranking clusters and scheduling portions of the array to the best matching cluster until the entire job array has been scheduled.

Thus, the system provides for submitting workload of submitted jobs within an internal or cloud cluster (computing environment), wherein the submission precisely, or within predetermined limits, mimics the behavior of a job scheduler-based job submission corresponding to a knowledge of the operation of the job scheduler, the system analyzes as much metadata as possible about the workload being submitted, prior to the workload being submitted to the intended scheduler.

The system provides a job routing mechanism coupled with a scheduler monitoring solution that can account for a flexible number of environment parameters to make a corresponding decision about job routing or workload distribution between a local or set of remote clusters, or schedulers, that are set forth in a routing table.

The system provides automated remote access to perform seamless (without requiring submitter action) input data transfer, remote command execution and job monitoring once the job routing decision is made.

The system provides for a set of jobs to be run on multiple heterogeneous environments and transparently deposit the results in a consolidated area when complete, without requiring performance related input (other than the job) from the user.

A system is provided for submitting a workload having associated metadata within a cloud computing environment, wherein the behavior of a scheduler-based job submission is mimicked corresponding to the knowledge of an operation of the job scheduler at least a portion of the available metadata corresponding to the submitted workload (job) before moving the job to an intender scheduler. In select configurations, the portion of the metadata is analyzed to determine the processing of the workload or job.

It is contemplated that a job routing mechanism can be coupled with a scheduler monitoring solution that can account for a flexible number of environment parameters to make a real time decision about job or workload routing between a local set of remote clusters, or schedulers, that are listed in a routing table. The routing table may be static or dynamic, as a new cluster can be created using commonly available cloud provisioning APIs and place the newly created cluster (or scheduler of the created cluster) in the routing table.

The system also provides for automated remote access to perform seamless data transfer (without requiring user control input), remote command execution, and job monitoring once a job routing decision is made by the system.

Therefore, a set of jobs can run on multiple heterogeneous environments, wherein the results (end product of the job) are transparently deposited in a consolidated area upon job completion.

The submitted job input and/or output data can be transferred synchronously as part of an initial transfer job, wherein the dependent submitted jobs are then run, and result data is transferred back as part of a dependent final transfer job to the originating cluster (or other designated cluster). Alternatively, it is understood, where submitted job input and/or output data are transferred asynchronously by another process, the transferred data is verified by the initial and final transfer jobs.

While a preferred embodiment of the invention has been shown and described with particularity, it will be appreciated that various changes in design and formulas and modifications may suggest themselves to one having ordinary skill in the art upon being apprised of the present invention. It is intended to encompass all such changes and modifications as fall within the scope and spirit of the appended claims.

The invention claimed is:

1. A method, implemented at a computer system that includes one or more processors, for directing a workload between distributed computing environments, the method comprising:
   identifying a plurality of computer clusters, the plurality of computer clusters including at least one local computer cluster and at least one remote computer cluster;
   configuring each of the plurality of computer clusters to comprise a distinct region of computational power having known performance characteristics, including a zone of performance, and a zone of reliability;
   continuously obtaining performance and use data from each of the plurality of computer clusters;
   receiving a job configured to be routed to a single, particular computer cluster of the plurality of computer clusters for processing;
   identifying metadata associated with processing the received job;
   analyzing the metadata of the job; and
   automatically routing at least a portion of the job to at least one computer cluster of the plurality of computer clusters that is different than the single, particular computer cluster, the routing automatically being performed in response to (i) the obtained performance and use data of the plurality of computer clusters and (ii) the analyzed metadata of the job.

2. The method of claim 1, wherein the continuously obtaining performance and use data includes obtaining performance and use data on a periodic basis.

3. The method of claim 1, wherein the routing mimics the behavior of a scheduler-based job submission.

4. The method of claim 1, wherein the routing corresponds to operation of a job handler.

5. The method of claim 1, wherein job routing is coupled to scheduler monitoring.

6. The method of claim 1, wherein routing includes executing the job on multiple heterogeneous environments and transparently locating results in a consolidated, independent of performance related input from the user.

7. The method of claim 1, wherein routing includes multi-pass routing of the job to a given subset of the plurality of clusters.

8. A computer system, comprising:
   one or more processors; and
   one or more hardware storage devices having stored thereon computer-executable instructions that are executable by the one or more processors to cause the computer system to direct a workload between distributed computing environments, the computer-executable instructions including instructions that are executable to cause the computer system to perform at least the following:
      identify a plurality of computer clusters, the plurality of computer clusters including at least one local computer cluster and at least one remote computer cluster;
      configure each of the plurality of computer clusters to comprise a distinct region of computational power having known performance characteristics, including a zone of performance, and a zone of reliability;
      continuously obtain performance and use data from each of the plurality of computer clusters;

receive a job configured to be routed to a single, particular computer cluster of the plurality of computer clusters for processing;

identify metadata associated with processing the received job;

analyze the metadata of the job; and automatically routing at least a portion of the job to at least one computer cluster of the plurality of computer clusters that is different than the single, particular computer cluster, the routing automatically being performed in response to (i) the obtained performance and use data of the plurality of computer clusters and (ii) the analyzed metadata of the job.

9. The computer system of claim 8, wherein the continuously obtaining performance and use data includes obtaining performance and use data on a periodic basis.

10. The computer system of claim 8, wherein the routing mimics the behavior of a scheduler-based job submission.

11. The computer system of claim 8, wherein the routing corresponds to operation of a job handler.

12. The computer system of claim 8, wherein job routing is coupled to scheduler monitoring.

13. The computer system of claim 8, wherein routing includes executing the job on multiple heterogeneous environments and transparently locating results in a consolidated, independent of performance related input from the user.

14. The computer system of claim 8, wherein routing includes multi-pass routing of the job to a given subset of the plurality of clusters.

15. A computer program product comprising one or more hardware storage devices having stored thereon computer-executable instructions that are executable by one or more processors of a computer system to cause the computer system to direct a workload between distributed computing environments, the computer-executable instructions including instructions that are executable to cause the computer system to perform at least the following:

identify a plurality of computer clusters, the plurality of computer clusters including at least one local computer cluster and at least one remote computer cluster;

configure each of the plurality of computer clusters to comprise a distinct region of computational power having known performance characteristics, including a zone of performance, and a zone of reliability;

continuously obtain performance and use data from each of the plurality of computer clusters;

receive a job configured to be routed to a single, particular computer cluster of the plurality of computer clusters for processing;

identify metadata associated with processing the received job;

analyze the metadata of the job; and automatically routing at least a portion of the job to at least one computer cluster of the plurality of computer clusters that is different than the single, particular computer cluster, the routing automatically being performed in response to (i) the obtained performance and use data of the plurality of computer clusters and (ii) the analyzed metadata of the job.

16. The computer program product of claim 15, wherein the continuously obtaining performance and use data includes obtaining performance and use data on a periodic basis.

17. The computer program product of claim 15, wherein the routing mimics the behavior of a scheduler-based job submission.

18. The computer program product of claim 15, wherein the routing corresponds to operation of a job handler.

19. The computer program product of claim 15, wherein routing includes executing the job on multiple heterogeneous environments and transparently locating results in a consolidated, independent of performance related input from the user.

20. The computer program product of claim 15, wherein routing includes multi-pass routing of the job to a given subset of the plurality of clusters.

* * * * *